US012783592B2

(12) United States Patent
Lim et al.

(10) Patent No.: US 12,783,592 B2
(45) Date of Patent: Nov. 3, 2026

(54) IDENTIFICATION AND ISSUANCE OF REPEATABLE QUERIES

(71) Applicant: Google LLC, Mountain View, CA (US)

(72) Inventors: Yew Jin Lim, Saratoga, CA (US); David Adam Faden, Mountain View, CA (US); Mario Tanev, San Francisco, CA (US); Lauren Ashley Koepnick, Capitola, CA (US); Sagar Gandhi, Seattle, WA (US); William Ming Zhang, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/172,227

(22) Filed: Apr. 7, 2025

(65) Prior Publication Data

US 2025/0238472 A1 Jul. 24, 2025

Related U.S. Application Data

(63) Continuation of application No. 18/517,509, filed on Nov. 22, 2023, now Pat. No. 12,292,941, which is a (Continued)

(51) Int. Cl.

*G06F 16/9535* (2019.01)
*G06F 16/953* (2019.01)

(Continued)

(52) U.S. Cl.

CPC ...... *G06F 16/9535* (2019.01); *G06F 16/9536* (2019.01); *G06F 16/9538* (2019.01)

(58) Field of Classification Search

None

See application file for complete search history.

(56) References Cited

U.S. PATENT DOCUMENTS

| | | | | |
|---|---|---|---|---|
| 8,316,037 B1 * | 11/2012 | Garg | ................... | G06F 16/9538 707/766 |
| 8,527,489 B1 * | 9/2013 | Li | ....................... | G06F 16/9532 707/706 |

(Continued)

FOREIGN PATENT DOCUMENTS

| | | |
|---|---|---|
| CN | 105830065 | 8/2016 |
| WO | WO 2006/011819 | 2/2006 |

OTHER PUBLICATIONS

Sarah Tyler; Large Scale Query Log Analysis of Re-Finding; 2010; ACM; pp. 191-200.*

(Continued)

*Primary Examiner* — Ann J Lo
*Assistant Examiner* — Jermaine A Mincey
(74) *Attorney, Agent, or Firm* — DORITY & MANNING P.A.

(57) ABSTRACT

Methods, systems, and apparatus, including computer programs encoded on a computer storage medium, that identify and issue search queries expected to be issued in the future. A set of search queries that have been issued by multiple user devices can be obtained. For each query instance, contextual data can be obtained. A first query and its contextual data can be input to a model that outputs the query's likelihood of being issued in the future. The model can be trained using contextual data for training queries and a corresponding labels for the training queries. The learning model outputs the first query's likelihood of being issued in future, and this query is stored as a repeatable query if the likelihood satisfying a repeatability threshold. Subsequently, a stored repeatable query is issued upon a selection of a user selectable interface component and the search engine provides search results for the query.

19 Claims, 4 Drawing Sheets

Related U.S. Application Data continuation of application No. 17/774,894, filed as application No. PCT/US2019/059976 on Nov. 6, 2019, now Pat. No. 11,868,417.

(51) Int. Cl.

| | |
|---|---|
| ***G06F 16/9532*** | (2019.01) |
| ***G06F 16/9536*** | (2019.01) |
| ***G06F 16/9538*** | (2019.01) |

(56) References Cited

U.S. PATENT DOCUMENTS

| | | | | |
|---|---|---|---|---|
| 8,825,691 | B2 * | 9/2014 | Knebel .............. | G06Q 30/0256 707/759 |
| 10,290,125 | B2 | 5/2019 | Awadallah et al. | |
| 10,706,450 | B1 | 7/2020 | Tavernier | |
| 11,397,770 | B2 | 7/2022 | Sekharan | |
| 2003/0018789 | A1 | 1/2003 | Ishiguro | |
| 2011/0072033 | A1 | 3/2011 | White et al. | |
| 2011/0238662 | A1 | 9/2011 | Shuster et al. | |
| 2012/0233140 | A1 | 9/2012 | Collins-Thompson et al. | |
| 2016/0179877 | A1 | 6/2016 | Koerner et al. | |
| 2020/0410011 | A1 | 12/2020 | Shi et al. | |
| 2021/0097374 | A1 | 4/2021 | Liu et al. | |

OTHER PUBLICATIONS

Claudio Lucchese; Discovering tasks from search engine query logs; ACM; pp. 1-43 (Year: 2013).*

Blanco et al., "Repeatable and Reliable Search System Evaluation using Crowdsourcing", Thirty-Fourth International Association for Computing Machinery Special Interest Group on Information Retrieval Conference on Research and Development in Information Retrieval, Beijing, China, Jul. 24-28, 2011, pp. 923-932.

International Preliminary Report on Patentability for Application No. PCT/US2019/059976, mailed May 19, 2022, 10 pages.

International Search Report and Written Opinion for Application No. PCT/US2019/059976, mailed Apr. 24, 2020, 11 pages.

Teevan et al., "Information Re-Retrieval: Repeat Queries in Yahoo's Logs", Thirtieth Annual International Association for Computing Machinery Special Interest Group on Information Retrieval Conference on Research and Development in Information Retrieval, Amsterdam, The Netherlands, Jul. 23-27, 2007, pp. 151-158.

Tyler et al., "Large Scale Query Log Analysis of Re-Finding", Third Association for Computing Machinery International Conference on Web Search and Data Mining, New York, New York, United States, Feb. 4-6, 2010, pp. 191-200.

* cited by examiner

IDENTIFICATION AND ISSUANCE OF REPEATABLE QUERIES

PRIORITY CLAIM

This application is a continuation of U.S. patent application Ser. No. 18/517,509 filed on Nov. 22, 2023, which is a continuation of U.S. patent application Ser. No. 17/774,894 filed on May 6, 2022, which claims priority under 35 U.S.C. § 371 to and the benefit of International Patent Application No. PCT/US2019/059976 filed on Nov. 6, 2019. Application claims priority to and the benefit of the applications and incorporates the applications herein by reference in their entirety.

FIELD

The present disclosure relates generally to the identification of repeatable queries. More particularly, the present disclosure relates to obtaining a set of search queries, determining contextual data for the queries, obtaining a likelihood of future use for a query based on a learning model processing the contextual data, identifying the query as a repeatable query based on the likelihood of future use, providing a user selectable interface component for the query, receiving a selection of the component, and providing a search results page for that query.

BACKGROUND

This specification relates to the identification and issuance of repeatable search queries (which are also referred to in this specification as "repeatable queries"), i.e., search queries that have previously been issued and are expected to be issued by one or more user devices in the future.

A user of a user device submits search queries to a search engine (or another search application) seeking information about different topics and in response, the search engine (or the other search application) provides search results that may be responsive to those topics. In some instances, a user may regularly submit the same search query that was previously submitted by that user or by other users. For example, a user may regularly issue a search query, such as "famous quotes." In this example, each time this search query is received by the search engine, the search engine searches for and identifies a set of search results that are responsive to this query. In some instances, for such repeated queries, the search engine's processing results in the identification and provision of the same set of search results.

SUMMARY

In general, one innovative aspect of the subject matter described in this specification can be embodied in methods that can include the operations of obtaining a set of search queries that have been issued by a plurality of user devices; determining, for each instance of each query in the set of search queries, contextual data representing a context in which the query was issued and user interactions with search results pages provided in response to the query; inputting, to a learning model and for a first query in the set of search queries, the determined contextual data for each instance in which the first query was issued, wherein the learning model (1) outputs a likelihood that a search query will be issued in the future and (2) is trained using contextual data determined for a set of training queries and a corresponding set of labels for the set of training queries, wherein each label indicates whether a training query has been issued a threshold number of times; obtaining, from the learning model and based on the input contextual data, a likelihood that the first query will be issued in the future; identifying the first query as a repeatable query based on the likelihood that the first query will be issued in the future satisfying a repeatability threshold; storing the first query with other search queries that have been identified as repeatable queries; providing, on a user device, a user selectable interface component that, upon being selected by a user device and without receiving a user input of a component of a query, results in issuance of a query from among the repeatable queries; receiving, from the user device, a first selection of the user selectable interface component that requests issuance of a particular query from among the repeatable queries; and providing, by a search engine and in response to receiving the first selection from the user device, a first search results page including search results for the particular query. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, storing the first query with other search queries that have been identified as repeatable queries can include storing, by the search engine, the first query with search results responsive to the first query.

In some implementations, the search engine can include one or more of the stored search results in the first search results page.

In some implementations, the contextual data for each instance of each query in the set of search queries, can include one or more of: a language in which the query is written; a geographic location from which the query is issued; a geographic location of interest to the user device that issued the query; a number of times that the query has been issued by a particular user device; a number of unique user devices that issued the query a threshold number of times; an embedding of the query that represents a semantic relationship between the query and other queries; a determination as to whether the query is directed to a particular web location or website; a selection by a user device of one or more search results provided on a search results page for the query; a time of viewing by a user device of one or more search results provided on a search results page for the query; and a selection of navigational interface elements on a search results page provided for the query.

In some implementations, the user-selectable interface component can be a selectable shortcut link included at a particular location on the user device, wherein selection by the user device of the selectable shortcut link causes the particular query associated with the shortcut link to be issued to the search engine.

In some implementations, the user-selectable interface component can be a drop down menu that lists a subset of the repeatable queries and from which the user can select the particular query, wherein selection of the particular query causes issuance of the particular query to be issued to the search engine.

In some implementations, the subset of the repeatable queries can include queries that are expected to be repeated by the user device based on a search history that includes queries previously issued by the user device.

In some implementations, methods can include the operations of: in response to identifying the first query as a repeatable query, determining, based on a search history for the user device, that the user device is expected to issue the first query in future; and in response to determining that the user device is expected to issue the first query in future, providing, in a notification to the user device and without receiving any request from the user device to execute the first query, a set of search results for the first query.

In some implementations, methods can include the operations of receiving, from the user device, a second selection of the user selectable interface component that requests the particular query to be issued; and providing, by the search engine and in response to receiving the second selection from the user device, a second search results page including search results for the particular query, wherein the search results page is different from the first search results page.

In some implementations, the second search results page can be different from the first search results page when search results of the second results page are ordered differently from the search results of the first search results page; search results of the second results page are different from the search results of the first search results page; or the second results page includes dynamic content that is not included on the first results page.

Particular embodiments of the subject matter described in this specification can be implemented to realize one or more of the following advantages. For example, the innovations described in this specification can save computing resources used in providing search results in response to the issued search queries. Conventionally, when a user writes and submits a search query to a search engine, the search engine searches for and identifies search results that are responsive to the search query. In contrast, the innovations described in this specification can reduce the computing resources needed to search for and identify search results for certain search queries that are identified. For example, the innovations described in this specification can identify a set of search queries as repeatable queries and store the responsive search results for these queries. Subsequently, when one of the repeatable queries is issued by a user device, the search engine can bypass the search engine's processing and provide the previously-stored, responsive search results for the repeated query.

The innovations described in this specification can also save time and resources that are typically required in manually issuing a search query. Conventionally, a user manually types in each search query into an interface provided by a search engine (e.g., a text box provided on the search engine's website) and then selects an interface component (e.g., a "Go" or a "Search" button) that results in the search query being issued to the search engine. In contrast, the innovations described in this specification provide user selectable interface components (e.g., drop down menus that include the repeatable queries, device home screen quick launch icons that directly issue a particular repeatable query to the search engine) that allow selection of already-formed search queries, which result in issuing the selected user query to the search engine. In some implementations, no user selection is even required and the search results for a search query that a user is expected to issue in the future are provided in a notification to the user device. As a result, user resources and processing by interface features on the search engine's website (or other application) required in inputting and processing the search query typed by the user, can be saved.

The innovations described in this specification can also save network resources by fetching search results for frequently repeated queries in the background when the user's device is on a local (e.g., home or work) wireless network. Relatedly, when a user device is determined to be in an unreliable network (e.g., a remote location with poor cellular LTE service, when the user device is not connected to a network for a threshold amount of time over a certain time interval), search results for repeated queries can be stored on the user device longer and thus, be more likely to be available to the user when the user's device is offline or otherwise only intermittently connected to a network.

The innovations described in this specification can also improve the ease of use of the search engine by enabling a user to issue certain repeatable queries without needing to input any part (i.e., any text that is part of the query) of such queries. Relatedly, the innovations described in this specification can improve and/or increase user engagement by providing newer or different search results (or other dynamic content) in response to search queries that are regularly issued by (or expected to be issued by) the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
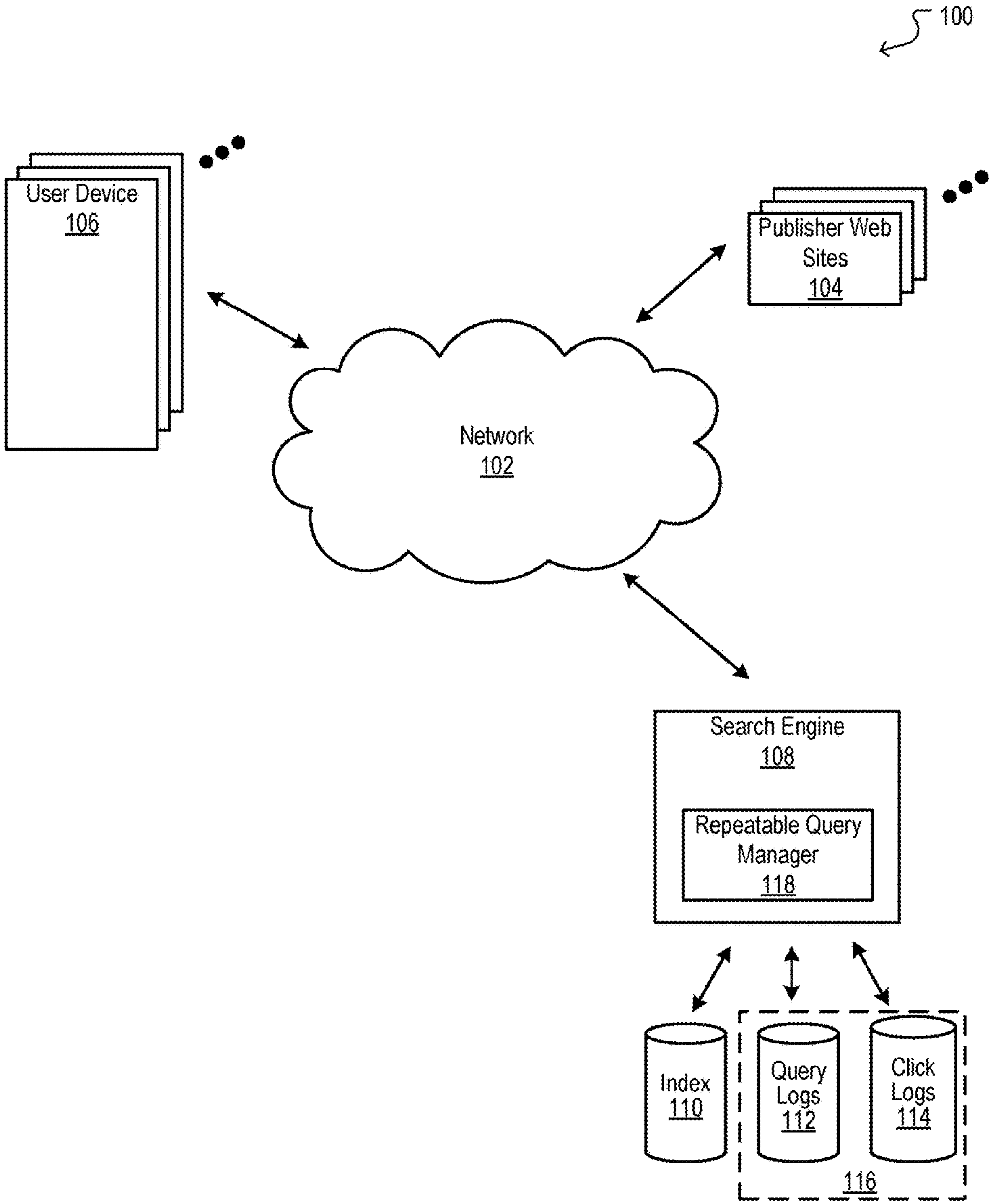
FIG. 1 is a block diagram of an example environment in which a search engine provides search results in response to search queries issued by user devices.

This specification relates to the identification and issuance of repeatable search queries. As summarized below and described in greater detail throughout this specification, a search engine can include a repeatable query manager that identifies a set of repeatable queries and enables user devices to quickly select and issue one or more of these queries.

To accomplish this, the repeatable query manager of a search engine first obtains, e.g., from the search engine's query logs, a set of search queries that have been issued by different user devices. For each instance of each query in the set of search queries, the repeatable query manager determines contextual data representing a context in which the query was issued and user interactions with search results pages provided in response to the query. Examples of such contextual data can include a language in which the query is written, a geographic location from which the query is issued, a geographic location of interest to the user device that issued the query, a number of times that the query has been issued in general or by a particular user device, a number of unique user devices that have issued the query a threshold number of times, an embedding of the query that represents a semantic relationship between the query and other queries, a determination as to whether the query is directed to a particular web location or website, a selection by a user device of one or more results provided on a search results page for the query, a time of viewing by a user device of one or more results provided on a search results page for the query, and a selection of navigational interface elements (e.g., back button, next page button, etc.) on a search results page provided for the query.

To determine whether a first query from the set of queries is a repeatable query, the repeatable query manager first inputs this query and the corresponding contextual data for each instance of that query into a learning model. The learning model outputs a likelihood that a query will be issued in the future. The learning model is trained using contextual data determined for a set of training queries and a corresponding set of labels for the set of training queries that each indicates whether a training query has been issued a threshold number of times. Each label indicates whether the query was observed to be repeated or otherwise to be repeatable. Based on the data input into the learning model, the learning model outputs a likelihood that the first query will be issued in the future.

The repeatable query manager then compares the likelihood output by the learning model with a repeatability threshold. If the likelihood satisfies (e.g., meets or exceeds) the repeatability threshold, the repeatable query manager identifies the query as repeatable; otherwise, it identifies the query as non-repeatable. If the first query is identified as repeatable, the repeatability query manager stores the first query with other search queries that have been identified as repeatable queries.

When a user accesses an interface provided by a search engine (e.g., the landing web page for a search engine's website), the repeatable query manager provides a user selectable interface component that, upon being selected by a user device and without receiving a user input of a component of a query, results in issuance of a query from among the repeatable queries. As used in this specification, a component of a query is text entered, e.g., using a keyboard, by a user of a user device in crafting a search query. For example, for a query "John Doe Sighting," a component of the query can be the letter "J," the words "John Doe" or the entire query.

In some implementations, the user selectable interface component can be a drop down menu that lists a subset of the previously-identified repeatable queries. The user device's selection of any repeatable query listed in such a drop down menu causes the user device to issue that query to the search engine. In some implementations, the user selectable interface component can also be a shortcut link that is included at a particular user device location (e.g., the user device's home screen). The user device's selection of the shortcut link results in launching an application (e.g., a web browser) and issuing the repeatable search query associated with the shortcut link to the search engine.

The search engine receives, from the user device, a selection of the user selectable interface component that requests issuance of a particular query from among the repeatable queries. In response to receiving the user device's selection, the search engine provides a search results page including the search results for the issued query.

These features and additional features are described in more detail below with reference to FIGS. 1-4.

Further to the descriptions throughout this specification, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user has control over what information is collected about the user, how that information is used, and what information is provided to the user.

FIG. 1 is a block diagram of an example environment 100 in which a search engine provides search results in response to search queries issued by user devices.

A computer network 102, such as a local area network (LAN), wide area network (WAN), the Internet, or a combination thereof, connects publisher web sites 104, user devices 106, and the search engine 108. The environment 100 can include many publisher web sites 104 and user devices 106.

A website 104 includes one or more resources associated with a domain name and hosted by one or more servers. An example website is a collection of web pages that can be formatted in hypertext markup language (HTML) that can contain text, images, multimedia content, and programming elements, such as scripts. Each website 104 is generally maintained by a content publisher, which is an entity that controls, manages, and/or owns the website 104.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources, the search engine 108 generally identifies the resources by crawling the publisher web sites 104 and indexing the resources provided by the publisher web sites 104. The indexed and, optionally, cached copies of the resources, are stored in an index 110.

The user devices 106 submit search queries to the search engine 108. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 108, or some other identifier that identifies the user device 106 or the user using the user device 106.

In response to the search request, the search engine 108 can use the index 110 to identify resources that are relevant to the queries. The search engine 108 identifies the resources in the form of search results and returns the search results to the user devices 106 in a search results page resource. A search result is data generated by the search engine 110 that identifies a resource that satisfies a particular search query, and includes a resource locator for the resource. An example search result can include a web page title, a snippet of text extracted from the web page, and the URL of the web page.

The search results can be ranked based on scores related to the resources identified by the search results, such as information retrieval ("IR") scores, and optionally a separate ranking of each resource relative to other resources (e.g., an authority score). The search results can be ordered according to these scores and provided to the user device 106 according to the order.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In some implementations, the queries submitted from user devices 106 are stored in query logs 112. Click data for the queries, the web pages referenced by the search results, and/or other interactions of the user with the queries (e.g., time of viewing search results, selections of particular search results, selection of different navigational elements, such as the back or next buttons, on the search results page, are stored in click logs 114. The query logs 112 and the click logs 114 define search history data 116 that include data from and related to previous search requests associated with unique identifiers of the user devices 106. The click logs define actions taken responsive to search results provided by the search engine 108. The query logs 112 and click logs 114 can be used to map queries submitted by the user devices to web pages that were identified in search results and the actions taken by users (i.e., that data are associated with the identifiers from the search requests so that a search history for each identifier can be accessed). The click logs 114 and query logs 112 can thus be used by the search engine to determine the sequence of queries submitted by the user devices, the actions taken in response to the queries, and how often the queries are submitted.

The search engine 108 also includes a repeatable query manager 118, which identifies repeatable queries, i.e., search queries that have been previously issued and are expected to be repeated by one or more users in the future. The structure and operations of the repeatable query manager 118 in identifying repeatable queries and making these queries available for issuance by users of the search engine are further described with reference to FIGS. 2 and 3.

Figure 2:
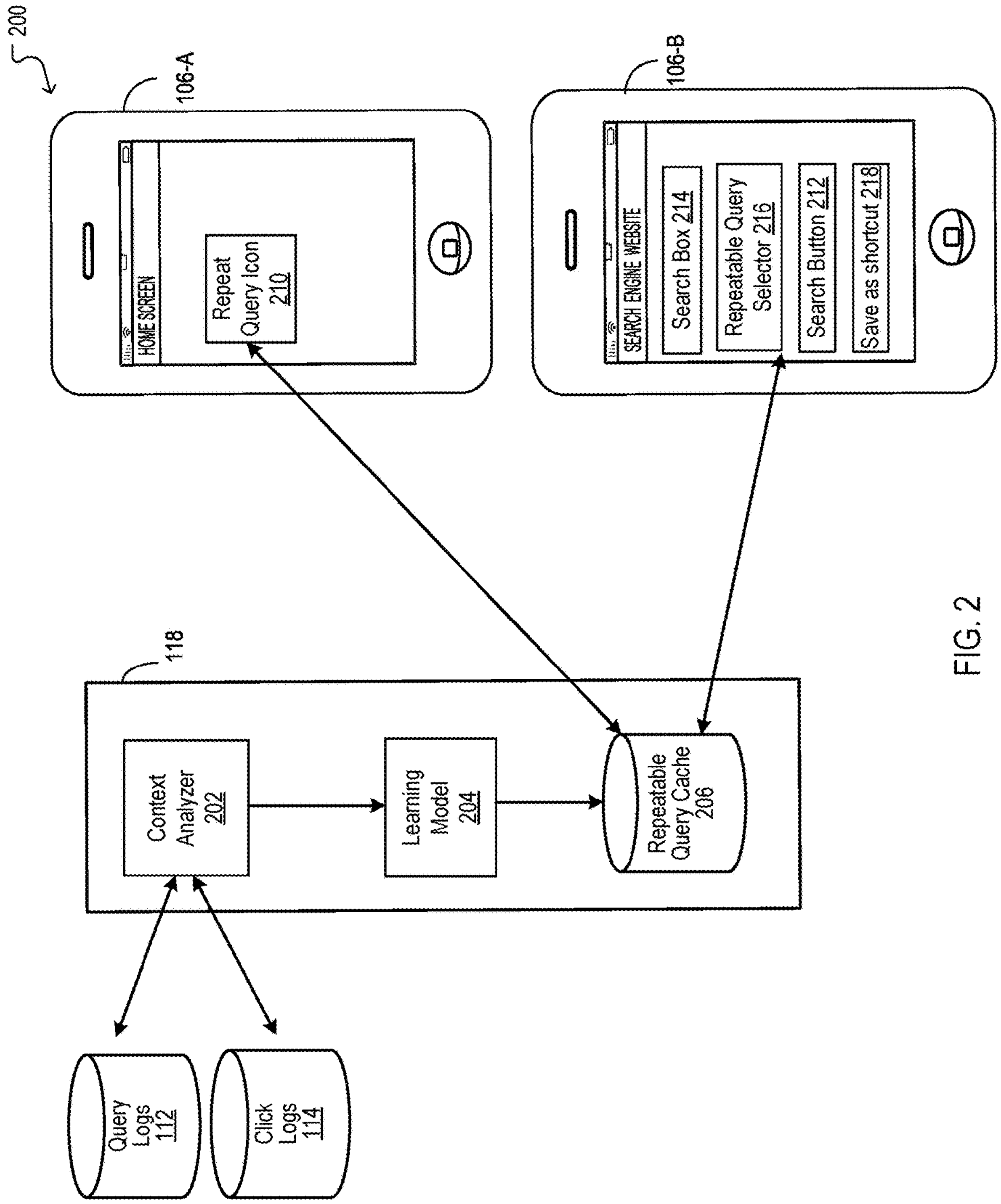
FIG. 2 is a block diagram that illustrate the structure and operation of the search engine of FIG. 1 in identifying and enabling issuance of repeatable queries.

FIG. 2 is a block diagram 200 that illustrates the structure and operation of the search engine of FIG. 1 in identifying and enabling issuance of repeatable queries.

The repeatable query manager 118 of the search engine 108 identifies repeatable queries using search queries that have been previously issued to the search engine 108. The repeatable query manager 118 of the search engine 108 includes a context analyzer 202, a learning model 204, and a repeatable query cache 206. The operations of each of these components are summarized below, but are described in greater detail with reference to FIG. 3. Although the repeatable query manager 118 is shown as part of the search engine 108 in FIG. 2, in some implementations, the repeatable query manager 118 can be, e.g., a separate web component (that executes instructions on a process that is separate) from the search engine 108. In such implementations, the repeated query manager 118 communicates with the search engine 108 over the network. Similarly, in some implementations, the components of the repeatable query manager 118 can be, e.g., separate web components that communicate with each other and/or the search engine 108 over the network.

The context analyzer 202 determines contextual data for previously-issued search queries, e.g., from the query logs 112 and click logs 114. A learning model 204 determines a likelihood of a particular query being issued in the future by a user device 106. The learning model 204 receives, as input, a particular query and the contextual data for that query and outputs a likelihood of this query being issued in the future by a user device 106. The learning model 204 can be a supervised machine learning model, a rules engine, or another appropriate statistical model. In implementations in which the learning model 204 is implemented as a supervised machine learning model, it is trained using a set of training search queries and their contextual data as well as a corresponding set of labels identifying whether the training queries are repeated in the future. In particular, each label indicates whether the query was observed to be repeated or otherwise to be repeatable.

Depending on the learning model 204's output specifying a likelihood that the query will be repeated in the future, the repeatable query manager 118 can identify the input query as a repeatable query by comparing this likelihood with a repeatability threshold (as further described with reference to FIG. 3). If the repeatable query manager 118 identifies a query as a repeatable query, the repeatable query manager 118 stores the query in the repeatable query cache 206 along with other queries identified as repeatable queries.

In some implementations, the repeatable query manager 118 makes a subset of the repeatable queries stored in the repeatable query cache 206 available on the user interface provided by the search engine 108. This is illustrated in user device 106-B shown in FIG. 2, which includes a repeatable query selector 216. The repeatable query selector 216 can be a dropdown menu that lists the subset of the repeatable queries (or another appropriate user interface element that can display a selectable list of items). The user's selection of any query from the dropdown followed by a selection of the search button 212 results in that query being issued to the search engine 108. In some implementations, the selection of any query from the repeatable query selector 216 results in the automatic issuance of the search query to the search engine. In other words, in such implementations, the user of the user device 106-B need not separately select the Search button 212 to issue the search query. In so issuing a repeatable query, the user device does not need to enter any query text in the search box 214.

In some implementations, the repeatable query manager 118 can provide an option, such as "Save as Shortcut" button 216, on the user interface provided by the search engine 108 to save one or more repeatable queries as shortcut links on the user device's home screen. In such implementations, the user device 106-B can select a particular query from the repeatable query selector 216 and then select the "Save as shortcut" 218 button. This results in the query being saved, e.g., as an icon (the repeat query icon 210), on the user device's home screen (or another device location configured by the user of the user device), as shown on user device 106-A. Alternatively, or additionally, the repeatable query manager 118 can provide the "Save as shortcut" 216 button on the search results page, the selection of which similarly results in the generation of the repeat query icon 210 on the user device's home screen (or other user-selected device location). The user's subsequent selection of the repeat query icon 210 results in launching an application (e.g., a web browser) that launches the search engine 108 and issues the repeatable query.

In some implementations, the repeatable query manager 118 stores, in the repeatable query cache 206, the repeatable queries as well as the search results corresponding to the queries. In other implementations, the search results corresponding to the repeatable queries are stored in a cache of the index 110. In either implementation, the search engine 108 retrieves and provides the stored search results in response to a repeatable query being issued by the user of the user device 106.

Figure 3:
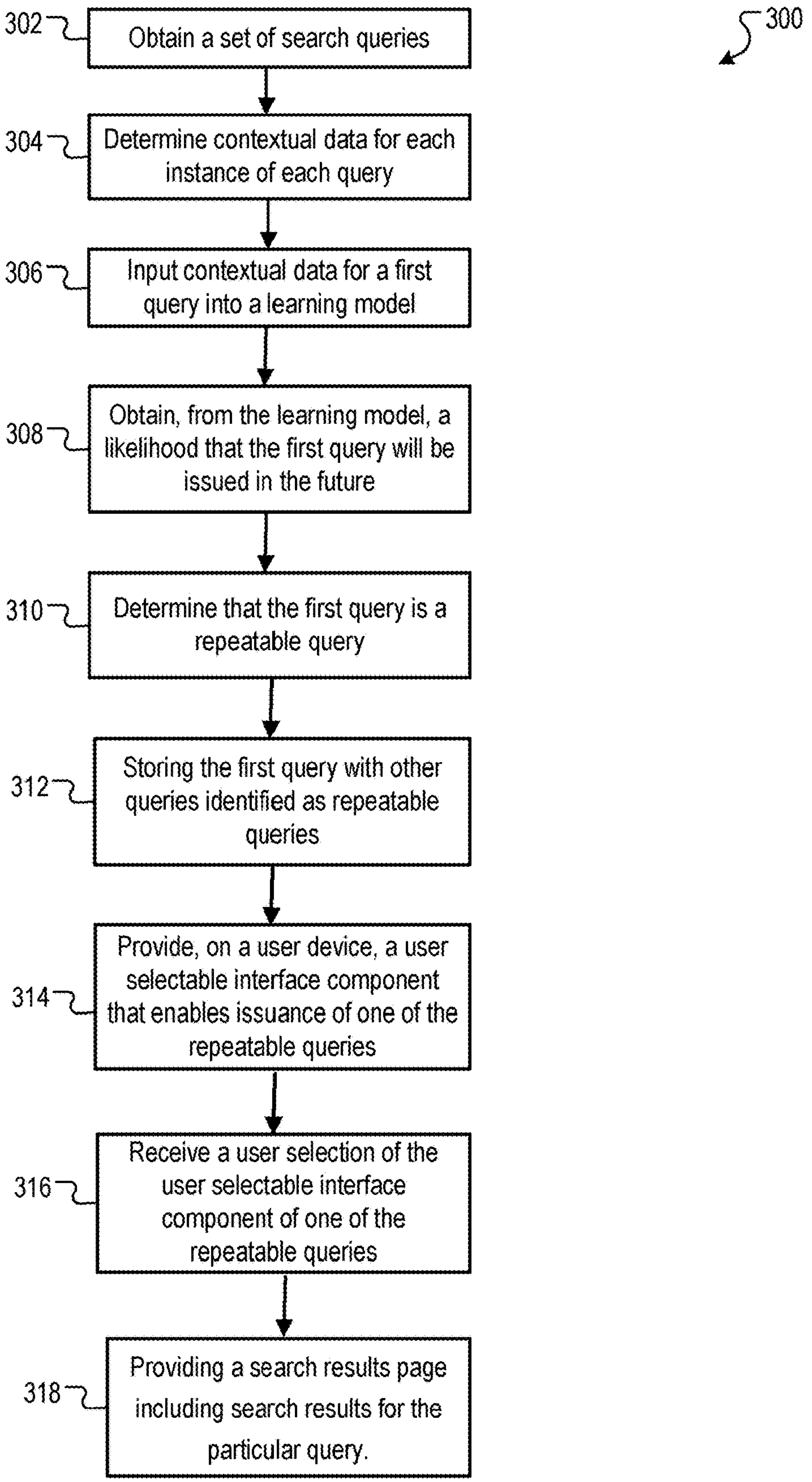
FIG. 3 is a flow diagram of an example process for identifying and issuing repeatable queries.

The above-described operations of the repeatable query manager 118, as well as its additional operations, are described further with reference to FIG. 3.

FIG. 3 is a flow diagram of an example process 300 for identifying and issuing repeatable queries. Operations of process 300 are described below as being performed by the components of the system described and depicted in FIGS. 1 and 2. Operations of the process 300 are described below for illustration purposes only. Operations of the process 300 can be performed by any appropriate device or system, e.g., any appropriate data processing apparatus. Operations of the process 300 can also be implemented as instructions stored on a (transitory or non-transitory) computer readable medium. Execution of the instructions cause one or more data processing apparatus to perform operations of the process 300. As described above with reference to FIG. 2, the repeatable query manager 118 (or any component thereof) can be, but need not be part of the search engine 108.

The repeatable query manager 118 obtains a set of search queries (at 302). In some implementations, the repeatable query manager 118 obtains, from the query logs 112, a set of search queries that have been previously been issued by one or more user devices.

The repeatable query manager 118 determines contextual data for each instance of each query in the set of search queries (at 304). In some implementations, for each instance of each query in the set of obtained search queries, the context analyzer 202 determines contextual data representing a context in which the query was issued and/or user interactions with search results pages provided in response to the query. The contextual data can be stored in and directly obtained from the query logs 112 and/or click logs 114. The contextual data can also be obtained by processing the data stored in the query logs 112 and/or the click logs 114.

The following paragraphs provide examples of the types of contextual data that the context analyzer 202 can obtain for each query instance. The below examples are illustrative and not an exclusive list of the types of contextual data that can be determined.

One example of contextual data includes a language in which the query is written/input. If the query logs 112 include a "query language" field (or other similar field), the context analyzer 202 can obtain the language value or identifier stored in this field. Alternatively, the context analyzer 202 can input the text of the query into a language identifier that identifies the language of the input query text.

Another example of contextual data includes a geographic location from which the query is issued. The geographic location can for example include a country, a city, a state, or other appropriate location identifier for the query's origin. The query logs 112 generally include such a geographic location of the query, which in turn can be obtained by the context analyzer 202.

Another example of contextual data includes a geographic location of interest (for example a country, a city, a state, or other appropriate location identifier) to the user device 106 that issued the query. In some implementations, this geographic location can be determined using the user device's search history or content viewership history, which may be obtained from, e.g., the query logs 112, the click logs 114, or from other sources, such as the user device's profile for the search engine 108.

Another example of contextual data includes a number of times that the query has been issued in general and/or by one or more user devices. The content analyzer 202 can obtain this information by parsing the query logs 112 to count the number of times that the particular query has been issued as well as the number of times that the particular query has been issued by distinct (i.e., unique) user devices.

Another example of contextual data includes a number of unique user devices that issued the query a threshold number of times. In some implementations, the context analyzer 202 parses the query logs 112 to count the number of times that the particular query has been issued by distinct (i.e., unique) user devices. The context analyzer 202 then compares this count to a threshold (e.g., two, three, or another value) to determine if the number of user devices that issued the query, did so a threshold number of times.

Another example of contextual data includes determining an embedding of the query that represents a semantic relationship between the query and other queries. Such an embedding can be implemented, e.g., using neural network-based techniques for natural language processing (NLP), which can include Bidirectional Encoder Representations from Transformers.

Another example of contextual data includes determining whether the query is directed to a particular web location or website. In some implementations, the context analyzer 202 can compare the text of the query to, for example, a list of known website/web locations and if a match is found, the context analyzer 202 determines that the particular query is directed to the identified web location or website. In some implementations, determining whether a query is aimed at a particular web location includes (1) determining if sitelinks appear on the search results for the query and (2) determining, e.g., the percentage of user interactions, for the highest returned result in the set of search results, which indicates the likelihood that users are mostly interested in that particular result.

Another example of contextual data includes the interactions by the user device on the search results page. Such interactions are stored in the click logs 114, which for example can include, among others, a selection by a user device 106 of one or more search results provided on a search results page for the query, a time of viewing by a user device of one or more results provided on a search results page for the query, a selection of or interaction with one or more navigational interface elements (e.g., the next button to navigate to the next set of results, the back button to return to the original search page, input of text into a search box to modify the query, and/or pressing a search button (or similar interface component) to issue another search).

The repeatable query manager 118 inputs contextual data for a first query into a learning model 204 (at 306). In some implementations, the contextual analyzer 202 inserts the first query and one or more of the contextual data items for each instance of that query into the learning model. As described with reference to FIG. 2, the learning model can be a supervised machine learning model that (1) outputs a likelihood that a query will be issued in the future and (2) is trained using contextual data determined for a set of training queries and a corresponding set of labels for the set of training queries, in which case each label indicates whether a training query has been issued a threshold (two, three, or any other selected value) number of times. In particular, each label indicates whether the query was observed to be repeated or otherwise to be repeatable. In some implementations, the training queries only include queries that have been repeated within a certain period (e.g., 28 days, one month, etc.). Such a technique avoids training the model with queries that are repeated only after long time intervals and as such, are not queries that users are likely to repeat on shorter intervals. Moreover, in some implementations, an additional model (e.g., a supervised machine learning model, a rules engine, or another statistical model) can be used in conjunction with the learning model to determine a particular time at which the query is expected to be repeated. For example, this additional model could be trained using known repeated queries and the times at which such queries are issued. As such, a query that is identified by the learning model as a repeated query can be input to this additional model, which in turn identifies a time at which the query is expected to be repeated. For example, if the additional model is trained using search queries (e.g., a search query for "weather") that is issued 70% of the time in the morning, the additional model can predict that this query is expected to be repeated in the morning.

The repeatable query manager 118 obtains, from the learning model 204, a likelihood that the first query will be issued in the future by a user device (at 308). In some implementations, based on the input first query and the corresponding contextual data, the learning model 204 outputs a likelihood that the first query will be issued in the future by a user device.

The repeatable query manager obtains this output and uses it to determine whether the first query is a repeatable query (at 310). In some implementations, the repeatable query manager 118 determines whether the first query is repeatable by comparing the likelihood that the first query will be issued in the future to a repeatability threshold. The repeatability threshold can be a value specified by the search engine 108 operator, which is intended to indicate a high likelihood of query repeatability. If this likelihood satisfies (e.g., meets or exceeds) the repeatability threshold, the repeatable query manager 118 identifies the first query as a repeatable query. On the other hand, if the likelihood does not satisfy the repeatability threshold, the repeatable query manager 118 does not identify the first query as a repeatable query.

If the first query is identified as a repeatable query, the repeatable query manager 118 stores the first query with other search queries that have been identified as repeatable queries (at 312). In some implementations, the repeatable query manager 118 stores repeatable queries in a repeatable query cache 206. In such implementations, the repeatable query manager 118 stores the first query along with the other repeatable queries in the repeatable query cache 206.

The repeatable query manager 118 provides, or causes to be provided, on a user device, a user selectable interface component that, upon being selected by a user device and without receiving a user input of a component of a query, results in issuance of a query from among the repeatable queries (at 314). In some implementations, when a user navigates to an interface provided by a search engine (e.g., a search engine's website), the repeatable query manager 118 provides a user selectable interface component on that interface. This user selectable interface component can be a drop down menu or another selectable interface component that can list a set of repeatable search queries (that are stored in the repeatable query cache 206) and enables a user to select one (or more) of the listed search queries.

The repeatable query manager 118 can provide or cause to be provided for viewing on the selectable user interface, a subset of the repeatable queries that can be listed and made available in the user selectable interface component. The listing of the repeatable search queries included with the user selectable interface component is provided by the repeatable query manager 118 without receiving any user input of a component of a query (which is also simply referred to in this specification as a "component of a search query" or "query component"). In other words, the listing of repeatable search queries provided by the repeatable query manager 118 is independent of the query (or any portion thereof) input by the user.

The repeatable query manager 118 can select the subset of repeatable queries (and provide these for display in the user selectable interface component) in different ways. For example, the repeatable query manager 118 can select a random set of N queries listed in the repeatable query cache 206. As another example, the repeatable query manager 118 can select a set of N queries from the repeatable query cache 206 that are most frequently issued by different user devices. As another example, the repeatable query manager 118 can select a set of N queries from the repeatable query cache 206 that are most frequently issued by the particular user device that is currently accessing the interface provided by the search engine. As another example, the repeatable query manager 118 can select a set of N repeatable queries from the repeatable query cache 206 based on a user device's search history and/or the types of content accessed by the user device. This can include a correlation (e.g., using a rules-based engine, a statistical modeling technique such as a machine learning algorithm, decision trees, etc.) between the content of the search queries issued by the user device, the search results selected by the user device, and/or types of content accessed by the user device, and the repeatable queries stored in the repeatable query cache 206. The top N search queries identified by such correlation can then be provided by the repeatable query manager 118 for presentation in the user selectable interface component.

Additionally, or alternatively, the user selectable interface component can also be a selectable shortcut link included at a particular location on the user device, e.g., the user device's home screen. As described in FIG. 1, this selectable shortcut link can be generated by the repeatable query manager 118 from the initial interface provided by the search engine (e.g., the landing web page arrived at when first navigating to the search engine's website) or from a search results page. The user's selection of the selectable shortcut link causes the particular repeatable query associated with the shortcut link to be issued to the search engine 108.

The repeatable query manager 118 receives, from the user device, a selection of the user selectable interface component that requests issuance of a particular query from among the repeatable queries (at 316). In some implementations, the user of the user device 106 selects one of the repeatable queries listed in the user selectable interface component (e.g., a drop down menu). The user device's selection of the particular repeatable query is transmitted to the search engine 108. In some implementations, the user of the user device 106 selects the shortcut link that is associated with a particular repeatable query.

In response to receiving the selection from the user device 106, the search engine 108 provides a search results page including search results for the particular query (at 318). Upon the user device's selection, the search engine 108 executes the query and provides a search results page that includes search results that are responsive to the selected query.

In some implementations, the repeatable query manager 118 can provide the same set of search results each time the user device issues the particular repeatable query. In such implementations, the repeatable query manager 118 can store this set of search results along with the repeatable query in the repeatable query cache 206 (or alternatively, in the index 110).

In some implementations, the repeatable query manager 118 can provide a different search results page each time the user device issues the particular repeatable query. In such implementations, the repeatable query manager 118 maintains a record of each time the user device issues the particular repeatable query and the corresponding search results page and the set of search results provided on that results page (including, e.g., the order in which the search results are provided). If the user device issues a particular repeatable query a first time, the search engine 108 provides a first search results page including a first set of search results. In this example, if the user devices issues the particular repeatable query a second time, the repeatable query manager 118 determines that the user device is issuing this query a second time and thus, causes the search engine to provide a second search results page including a second set of search results that is different from the first search results page. For example, the second search results page can be different from the first search results page in that the search results on the second search results page are ordered differently from the search results on the first search results page. In other words, the first and second set of search results can include the same search results but the ordering can be different. As another example, one or more search results in the second set of search results can be different from the search results in the first set of search results. As another example, the second search results page can be different from the first search results page in that the second search results page can include dynamic content that is either not included on the first search results page or is different from the dynamic content included on the first search results page. In such implementations, the search engine 108 could prioritize the indexing of sites connected to repeatable queries in the expectation that users will want dynamic (e.g., different or newer) content for such queries each time the query is issued. By prioritizing the content to index, the techniques described here has the advantage of saving search engine 108 resources required for indexing.

As described above, the repeatable query manager 118 can identify a first query as a repeatable query based on a search history or content access history of the user device. In some implementations, the search engine 108 can send, to the user device, a notification including the search results for the particular query without receiving any selection of the user selectable interface component or other request by the user device to issue that particular query. For example, the search engine 108 can send a notification to the user device 106 (e.g., as a device notification or an email) that identifies the particular query (e.g., in a message that states that the user of the device may be interested in results for the particular repeatable query) and includes the set of search results for that query. In some implementations, the notification including the search results is sent to the user deice 106 at a time when the user is expected to issue the query. This can be determined partly based on the content of the query itself, which may include some time element that can be used to determine a time for delivery of the results. For example, if a user is expected to repeat a query "concerts this weekend," the presence of "the weekend" could be used to infer that the search results for this query should be delivered in the notification on a weekly basis during the week and ahead of each weekend. Additional factors that can be used in determining when the user is expect to issue a query can also include data about user interactions with the search results in the notification (e.g., time accessed, day accessed, which result selected, etc.).

Figure 4:
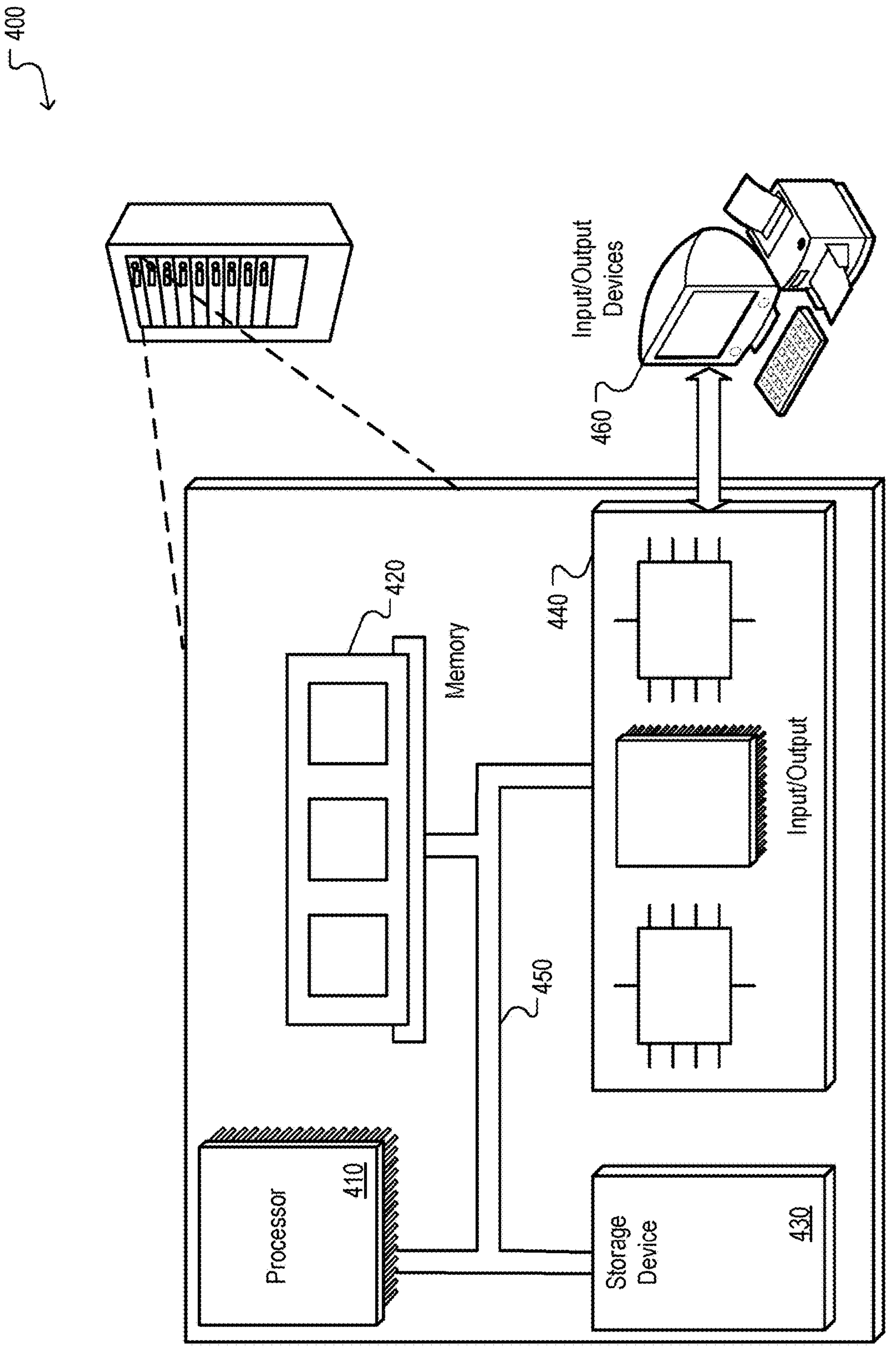
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computing system, the system comprising:
- one or more processors; and
- one or more non-transitory computer-readable media that collectively store instructions that, when executed by the one or more processors, cause the computing system to perform operations, the operations comprising:
  - obtaining, from a search engine query log, a set of search queries that have been issued by a plurality of unique user devices;
  - determining, for each instance of each query in the set of search queries, contextual data representing a context in which the query was issued and user interactions with search results pages provided in response to the query;
  - processing, for a first query in the set of search queries, the determined contextual data for each instance in which the first query was issued inputting with a machine learning model to determine a likelihood that the first query will be issued in a future, wherein the learning model (1) outputs a likelihood that a search query will be issued in the future and (2) is trained using contextual data determined for a set of training queries and a corresponding set of labels for the set of training queries, wherein each label indicates whether a training query has been issued a threshold number of times;
  - identifying the first query as a repeatable query based on the likelihood that the first query will be issued in the future satisfying a repeatability threshold;
  - storing, in a repeatable query cache, the first query with other repeatable search queries that have been previously identified as repeatable queries;
  - identifying a set of search results responsive to the first query;
  - storing, in the repeatable query cache, the set of search results;
  - determining a particular context associated with a user;
  - determining, with a repeatable query manager, a particular query from the repeatable query cache based on the particular context; and
  - providing, on a user device, a user selectable interface component that, upon being selected by a user device and without receiving a user input of a component of a query, results in providing the set of search results for display and issuance of the particular query from the repeatable query cache.

2. The system of claim 1, wherein the learning model comprises a machine learning model and a rules engine.

3. The system of claim 1, wherein the contextual data comprises: a geographic location from which the query is issued.

4. The system of claim 1, wherein the contextual data, comprises at least one of:
- an embedding of the query that represents a semantic relationship between the query and other queries; or
- a determination as to whether the query is directed to a particular web location or website.

5. The system of claim 1, wherein the contextual data, comprises:
- a number of times that the query has been issued by a particular user device; and
- a number of unique user devices that issued the query the threshold number of times.

6. The system of claim 1, wherein the contextual data is determined with a context analyzer and based on a click log.

7. The system of claim 1, wherein the contextual data is determined with a context analyzer and based on a query log.

8. The system of claim 1, wherein the repeatable query manager is part of a search engine that obtains the set of search queries and searches the particular query upon selection of the user selectable interface component.

9. The system of claim 1, wherein the repeatable query cache stores the repeatable queries and search results associated with the repeatable queries.

10. A computer-implemented method, the method comprising:
- obtaining, by a computing system comprising one or more processors and from a search engine query log, a set of search queries that have been issued by a plurality of unique user devices;
- determining, by the computing system and for each instance of each query in the set of search queries, contextual data representing a context in which the query was issued and user interactions with search results pages provided in response to the query;
- processing, by the computing system and for a first query in the set of search queries, the determined contextual data for each instance in which the first query was issued inputting with a machine learning model to determine a likelihood that the first query will be issued in a future, wherein the learning model (1) outputs a likelihood that a search query will be issued in the future and (2) is trained using contextual data determined for a set of training queries and a corresponding set of labels for the set of training queries, wherein each label indicates whether a training query has been issued a threshold number of times;

identifying, by the computing system, the first query as a repeatable query based on the likelihood that the first query will be issued in the future satisfying a repeatability threshold;

storing, by the computing system and in a repeatable query cache, the first query with other repeatable search queries that have been previously identified as repeatable queries;

identifying, by the computing system, a set of search results responsive to the first query;

storing, by the computing system and in the repeatable query cache, the set of search results;

determining, by the computing system, a particular context associated with a user;

determining, by the computing system and with a repeatable query manager, a particular query from the repeatable query cache based on the particular context; and providing, by the computing system and on a user device, a user selectable interface component that, upon being selected by a user device and without receiving a user input of a component of a query, results in providing the set of search results for display and issuance of the particular query from the repeatable query cache.

11. The method of claim 10, wherein the user selectable interface component is a selectable shortcut link included at a particular location on the user device, wherein selection by the user device of the selectable shortcut link causes the particular query associated with the shortcut link to be issued to a search engine.

12. The method of claim 10, wherein the user selectable interface component is a drop down menu that lists a subset of the repeatable queries and from which the user can select the particular query, wherein selection of the particular query causes issuance of the particular query to be issued to a search engine.

13. The method of claim 12, wherein the subset of the repeatable queries includes queries that are expected to be repeated by the user device based on a search history that includes queries previously issued by the user device.

14. The method of claim 10, further comprising:

receiving, from the user device, a first selection of the user selectable interface component;

providing, by a search engine and in response to receiving the first selection from the user device, a first search results page including search results for the particular query;

receiving, from the user device, a second selection of the user selectable interface component that requests the particular query to be issued; and providing, by the search engine and in response to receiving the second selection from the user device, a second search results page including search results for the particular query, wherein the search results page is different from the first search results page.

15. The method of claim 14, wherein the second search results page is different from the first search results page when:

search results of the second results page are ordered differently from the search results of the first search results page;

search results of the second results page are different from the search results of the first search results page; or the second results page includes dynamic content that is not included on the first results page.

16. One or more non-transitory computer-readable media that collectively store instructions that, when executed by one or more computing devices, cause the one or more computing devices to perform operations, the operations comprising:

obtaining, from a search engine query log, a set of search queries that have been issued by a plurality of unique user devices;

determining, for each instance of each query in the set of search queries, contextual data representing a context in which the query was issued and user interactions with search results pages provided in response to the query;

processing, for a first query in the set of search queries, the determined contextual data for each instance in which the first query was issued inputting with a machine learning model to determine a likelihood that the first query will be issued in a future, wherein the learning model (1) outputs a likelihood that a search query will be issued in the future and (2) is trained using contextual data determined for a set of training queries and a corresponding set of labels for the set of training queries, wherein each label indicates whether a training query has been issued a threshold number of times;

identifying the first query as a repeatable query based on the likelihood that the first query will be issued in the future satisfying a repeatability threshold;

storing, in a repeatable query cache, the first query with other repeatable search queries that have been previously identified as repeatable queries;

identifying a set of search results responsive to the first query;

storing, in the repeatable query cache, the set of search results;

determining a particular context associated with a user;

determining, with a repeatable query manager, a particular query from the repeatable query cache based on the particular context; and providing, on a user device, a user selectable interface component that, upon being selected by a user device and without receiving a user input of a component of a query, results in providing the set of search results for display and issuance of the particular query from the repeatable query cache.

17. The one or more non-transitory computer-readable media of claim 16, wherein the contextual data for each instance of each query in the set of search queries, comprises at least one of:

a language in which the query is written;

a geographic location from which the query is issued;

a geographic location of interest to the user device that issued the query;

a number of times that the query has been issued by a particular user device;

a number of unique user devices that issued the query a threshold number of times;

an embedding of the query that represents a semantic relationship between the query and other queries;

a determination as to whether the query is directed to a particular web location or website;

a selection by a user device of one or more search results provided on a search results page for the query;

a time of viewing by a user device of one or more search results provided on a search results page for the query; or a selection of navigational interface elements on a search results page provided for the query.

18. The one or more non-transitory computer-readable media of claim 16, wherein storing the first query with other repeatable search queries that have been previously identified as repeatable queries comprises storing, by a search engine, the first query with search results responsive to the first query.

19. The one or more non-transitory computer-readable media of claim 18, the operations further comprise:

receiving, from the user device, a first selection of the user selectable interface component; and providing, by the search engine and in response to receiving the first selection from the user device, a first search results page including search results for the particular query, wherein the search engine includes one or more of the stored search results in the first search results page.

* * * * *